(No Model.)

J. L. HASTINGS & J. S. STEWART.
STEAM TRAP.

No. 258,915. Patented June 6, 1882.

Witnesses:
George M. Clarke
W. L. Howser

Inventor
James L. Hastings
James S. Stewart
By W. Burris
Attorney

UNITED STATES PATENT OFFICE.

JAMES L. HASTINGS AND JAMES S. STEWART, OF PHILADELPHIA, PA.

STEAM-TRAP.

SPECIFICATION forming part of Letters Patent No. 258,915, dated June 6, 1882.

Application filed September 17, 1881. (No model.)

*To all whom it may concern:*

Be it known that we, JAMES L. HASTINGS and JAMES S. STEWART, of Philadelphia, in the county of Philadelphia and State of Pennsylvania, have invented certain new and useful Improvements in Steam-Traps; and we do hereby declare that the following is a full, clear, and exact description of the invention, which will enable others skilled in the art to which it appertains to make and use the same, reference being had to the accompanying drawings, and to letters of reference marked thereon, which form a part of this specification.

Our invention relates to steam-traps operated by the expansion and contraction of a tube through which steam and water escape; and it consists of the combination, with such a tube having a head-piece provided with a valve-seat and valve-arms forming pivotal bearings for the operating-levers, of two solid rods connected with the levers, the rods and levers being adjusted so that when the water is in the tube, causing its contraction, the valve will be opened to allow the water to escape, and when the steam is in the tube, causing its expansion, the valve will be closed, as hereinafter fully described.

Figure 1:
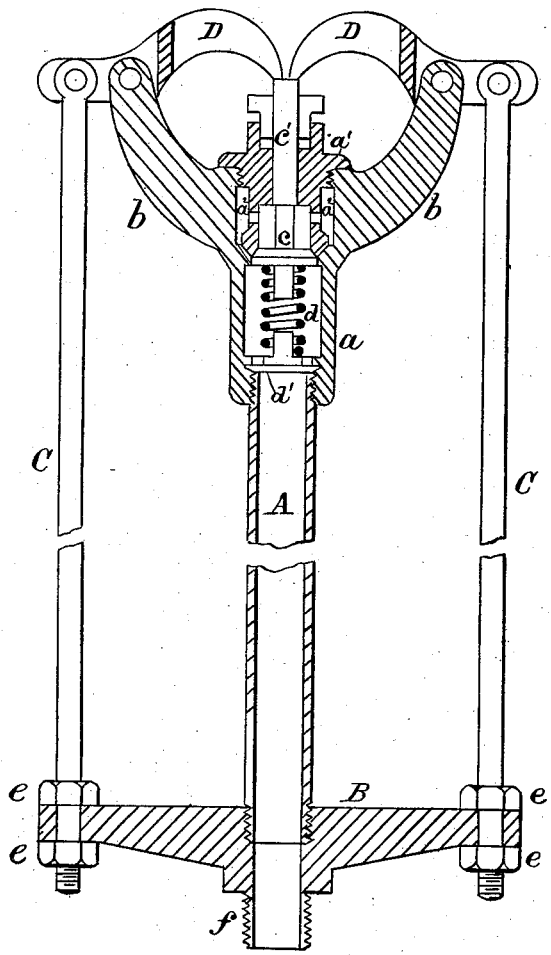
Figure 2:
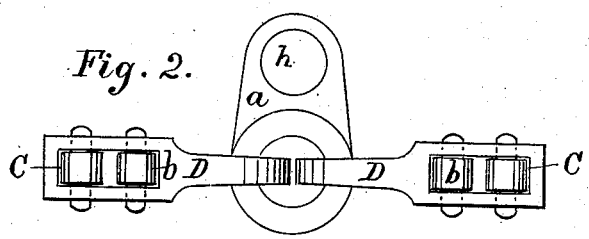
Figure 3:
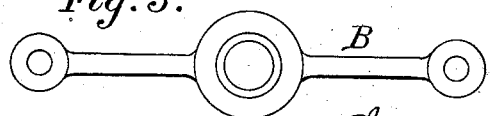

In the accompanying drawings, which form a part of this specification, Figure 1 represents a side elevation, partly in section, of the steam-trap embodying our invention. Fig. 2 is a top view of the same. Fig. 3 is a bottom view of the same.

A designates a brass tube, about twenty-two inches long, screwed into a head-piece, $a$, having arms $b$. The head-piece is provided with a slotted plug, $a'$, which is screwed into the head-piece and forms the seat for the valve $c$, which is provided with a stem, $c'$, extended through the plug and forming the bearing of the points of the levers, hereinafter described. A spiral spring, $d$, is adjusted below the valve on a pin formed on the bearing-piece $d'$.

B is a yoke, into which the lower end of the tube A is screwed.

C C are rods, the lower ends of which extend through holes in the ends of the yoke, and these rods are adjustable in length by means of the nuts $e$. The upper ends of the rods are pivoted to the levers D D, which are pivoted to the arms $b$ $b$ of the head-piece. The inner ends of these levers are pointed and curved so as to bear upon the top of the valve-stem $c'$.

The yoke is provided with a tube, $f$, having screw-threads, for connecting the trap with a pipe or tank to be relieved of water.

In operation the trap is placed in a horizontal position, and the tube $f$ is connected with the pipe or tank to be relieved of water caused by condensation. The rods are then adjusted by means of nuts $e$, so that the points of the levers bearing upon the valve-stem open the valve, allowing the water to escape past the valve and through the slots $a^2$ into a waste-pipe (not shown) screwed into the opening $h$ (shown in Fig. 2) in the side of the head-piece. The water, having thus escaped, is followed by steam, which, by its higher temperature, expands the tube A, raising the arms $b$, which raise the levers from the valve-stem and the spring closes the valve. The water, again flowing into the tube, contracts it, causing the levers to again open the valve, and thus the operation is repeated.

We are aware that it is not new in steam-traps to cause the escape of water by the expansion and contraction of a tube. Therefore

What we claim as new, and desire to secure by Letters Patent, is—

1. The levers D D, in combination with the valve $c$ in the slotted plug $a'$, the spring $d$, and bearing-piece $d'$, substantially as and for the purposes described.

2. The plug $a'$, slotted and screwed into the head-piece $a$, in combination with a valve, $c$, substantially as set forth.

3. In combination, the head-piece $a$, slotted plug $a'$, valve $c$, spring $d$, and the bearing-piece $d'$, provided with a pin, substantially as and for the purposes described.

4. The combination, with the head-piece $a$, slotted plug $a'$, valve $c$, spring $d$, and bearing-piece $d'$, provided with a pin, of the yoke B, levers D D, and the rods C C, provided with set-nuts $e$, substantially as and for the purposes described.

In testimony that we claim the foregoing as our own we affix our signatures in presence of two witnesses.

JAMES L. HASTINGS.
    JAMES S. STEWART.

Witnesses:
 JOS. S. RILEY,
 RICHARD C. TOFT.